April 20, 1965         A. HAHNEL         3,179,933
COLLISION WARNING SYSTEM
Filed April 22, 1960                    2 Sheets-Sheet 1

INVENTOR.
ALWIN HAHNEL
BY
ATTORNEY

United States Patent Office 3,179,933
Patented Apr. 20, 1965

3,179,933
COLLISION WARNING SYSTEM
Alwin Hahnel, Rochester, N.Y., assignor to General Dynamics Corporation, Rochester, N.Y., a corporation of Delaware
Filed Apr. 22, 1960, Ser. No. 24,116
5 Claims. (Cl. 343—6)

This invention relates to a warning system for warning the operator of a moving vehicle of a possible collision with one or more vehicles moving relative thereto.

One of the principal difficulties in the design of self-contained vehicle collision avoidance systems is that they must use the second time derivative of the relative range or the first time derivative of the relative bearing angle to determine a collision risk. A large number of false alarms may occur with such systems unless higher precision measurements of range and bearing angles are used than are normally obtainable with practical equipment located aboard the vehicle.

In accordance with the invention, the aforesaid difficulty is overcome by using the instrument data aboard the intruding vehicle in such a way that the intruding vehicle is indicated by the position indicator of the protected vehicle only when the former is moving at a critical heading and speed relative to the heading and speed of the latter, and—in the case of aircraft—only when the planes are flying at substantially the same altitude.

The protected vehicle carries a directional high frequency radar such as is normally used as part of the weather equipment carried by large airplanes. The intruding vehicle carries a transponder which will be actuated by pulses from the radar in the protected vehicle to transmit to said protected vehicle information indicative of the heading and speed of the intruding vehicle. If the vehicles are aircraft, information concerning altitude is provided in the protected plane and information concerning altitude of the intruding plane also would be transmitted to the protected plane along with the heading and speed information. The information transmitted to the protected vehicle by the intruding vehicle may be either analog or digital information superimposed upon the carrier of the transponder.

The protected vehicle contains a control device for converting the coded information transmitted by the transponder of the intruding vehicle into a form required for proper operation of the indicator in the protected vehicle. In the case of aircraft, the altitude information may indicate that the two aircraft do not simultaneously occupy the same altitude; in this event, means may be provided for preventing the supply of coded information concerning heading and speed to the control device, thereby eliminating the necessity for further concern with the intruding craft. In the control device, a vector addition is made of a voltage representing the heading and speed vector of the intruding vehicle and the heading and speed vector of the protected vehicle. A resultant voltage is obtained which corresponds to the closing speed vector. The control device operates a gate circuit to permit actuation of the indicator at a time when the closing speed vector is in a position corresponding to a collision course between the vehicles. The indicator may be a plan position indicator which forms a portion of the radar equipment in the protected vehicle. Alternately, the indicator may be a tone generator, or a visual indicator, such as a lamp.

One embodiment of a control device includes a two-phase synchro or resolver which translates the heading and speed of the two vehicles into two corresponding single frequency sinusoidal voltages, each having a particular phase relative to some reference and an amplitude corresponding to the heading and speed of the corresponding vehicle. The two sinusoidal voltages representing the aforesaid vector information are applied to the stator windings of the resolver and establish a resultant field. The rotor of the resolver, which may be turned by the antenna drive motor of the radar in the protected vehicle, rotates through the resultant field set up in the vicinity of the stator windings by the aforesaid sinusoidal voltages and a voltage is induced in the rotor winding which varies from a minimum to a maximum, depending upon the position of the rotor and upon the resultant field configuration about the stator windings. A null is produced in the rotor winding at two positions of the rotor. The physical rotor angle, at the instant of the null, corresponds to the direction of the closing speed vector relative to the heading of the protected vehicle. The indicator tube may be actuated when the resolver output is a null and in the immediate vicinity of the null. If a plan position indicator is used in the protected vehicle, sensitivity to returning radar pulses will be restricted to a narrow sector of the indicator. If a radar echo or blip from the intruding vehicle appears in this illuminated sector, the operator of the protected vehicle receives a visual warning that a collision between the protected vehicle and the intruding vehicle responsible for the echo is imminent. The operator then may make any necessary evasive maneuver to insure an adequate miss distance, as indicated by the absence of a radar echo or blip in the illuminated sector on the indicating device.

If the indicator is in the form of a bell or lamp, the indicator may be energized during the rotor null provided that a radar echo is also present which results in the application of a control signal to the indicator.

The system, according to the invention, not only eliminates the large number of false alarms that conventional proximity warning systems provide in congested areas, but also has the advantage that the warning concerning the intruding vehicle disappears as soon as the protected vehicle has made a maneuver sufficient to avoid collision. In contrast, conventional systems require that the pilot complete a prescribed standard evasive maneuver whenever he is unable to see the intruding vehicle to insure that an adequate miss distance exists. This maneuver may be somewhat complicated and, sometimes, there is no assurance that this evasive maneuver will prevent subsequent collision.

Other objects and uses of this inveniton will become more apparent from examination of the drawings, in which.

Figure 1:
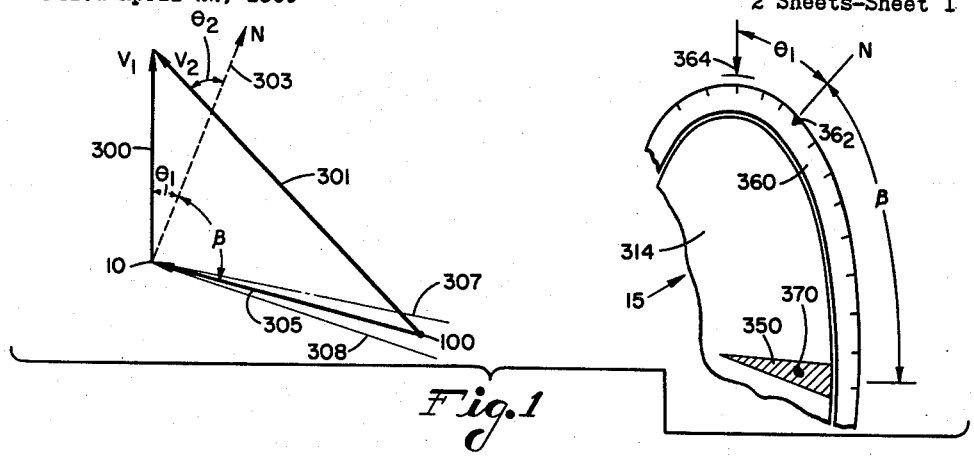
FIG. 1 is a vector diagram representative of the relative motion of two vehicles and a portion of a typical indicator indicating a display related to the particular condition of the vector diagram.

Referring to the vector diagram of FIG. 1, the vector 300 represents the speed $V_1$ and flight direction $\theta_1$ of the protected plane 10, while the vector 301 represents the speed $V_2$ and flight direction $\theta_2$ of the intruding plane 100. The angles $\theta_1$ and $\theta_2$ may be measured from some reference direction, such as true North represented by the dotted line 303. By subtracting the vector 300 of the protected plane from the vector 301 of the intruding plane, the resultant vector (closing speed vector) 305 is obtained which is disposed at an angle $\beta + \theta_1$ relative to the heading of the protected plane. Collision of the two planes is imminent only if the interrogated or intruding plane 100 is in the position shown in the vector diagram of FIG. 1, or possibly in a narrow sector disposed about point 100 on the diagram, as indicated by the sector bounded by lines 307 and 308. Only if the vectors 300 and 301 are of such magnitude and direction that the resultant vector points substantially in the direction in which the intruding plane is observed is there a possibility of collision, assuming that the vectors themselves do not change appreciably with time.

In accordance with the invention, the vectors 300 and 301 are represented by sinusoidal A.C. voltages whose phase and magnitude depend upon the direction and magnitude of the corresponding vector. The manner in which these voltages are derived will be described subsequently. The system includes means whereby the A.C. voltages set up a resultant field corresponding to the resultant vector 305. A rotary means driven by the rotary antenna in the protected plane moving in this resultant field has a voltage induced which varies from a maximum to a minimum in a manner dependent upon the characteristic of this resultant field. At some point during each rotation of the antenna, there will be a minimum voltage induced in the rotary means. The position of the rotary means at which this minimum voltage occurs will depend upon the resultant field through which the rotating means moves; this position, in turn, is a function of the position of the closing speed vector. Means are provided for illuminating the face 314 of a conventional plan position indicator display tube in the radar of the protected plane at sector 350, as shown in FIG. 1, during the time of minimum induced voltage, and over a small interval of time adjacent this time. The manner in which the remainder of the display tube is desensitized will be set forth more fully later during the description of the system of FIGS. 2 and 3. The central portion of this sector is disposed at an angle $\beta$ with respect to true North. True North is indicated by the indicia 362 on an adjustable ring 360 surrounding the display tube 15. The direction of the protected plane 10 can be noted by reading the index mark 364 appearing opposite the calibrated ring 360; the position of the index mark 364 may be made to follow the movement of the flight direction of the indicator of the protected plane. The position of the sensitive sector of the display tube corresponds to the position of the resultant vector 305. If a radar signal occurs during the time interval that the rotary means is at a position of minimum induced voltage, that is, if the driven radar antenna is pointed at an intruding plane when the rotary means is in the position of minimum induced voltage, a blip 370 caused by the presence of the target will appear on the display tube screen within the sensitized sector. The presence of such a target blip provides visual warning to the operator of the protected plane of the existence of a collision condition and the necessity to vary either the altitude, speed or flight direction, or any combination thereof, to avoid a collision. The manner in which the flight is altered to avoid collision is prescribed by flight regulations.

Figure 2:
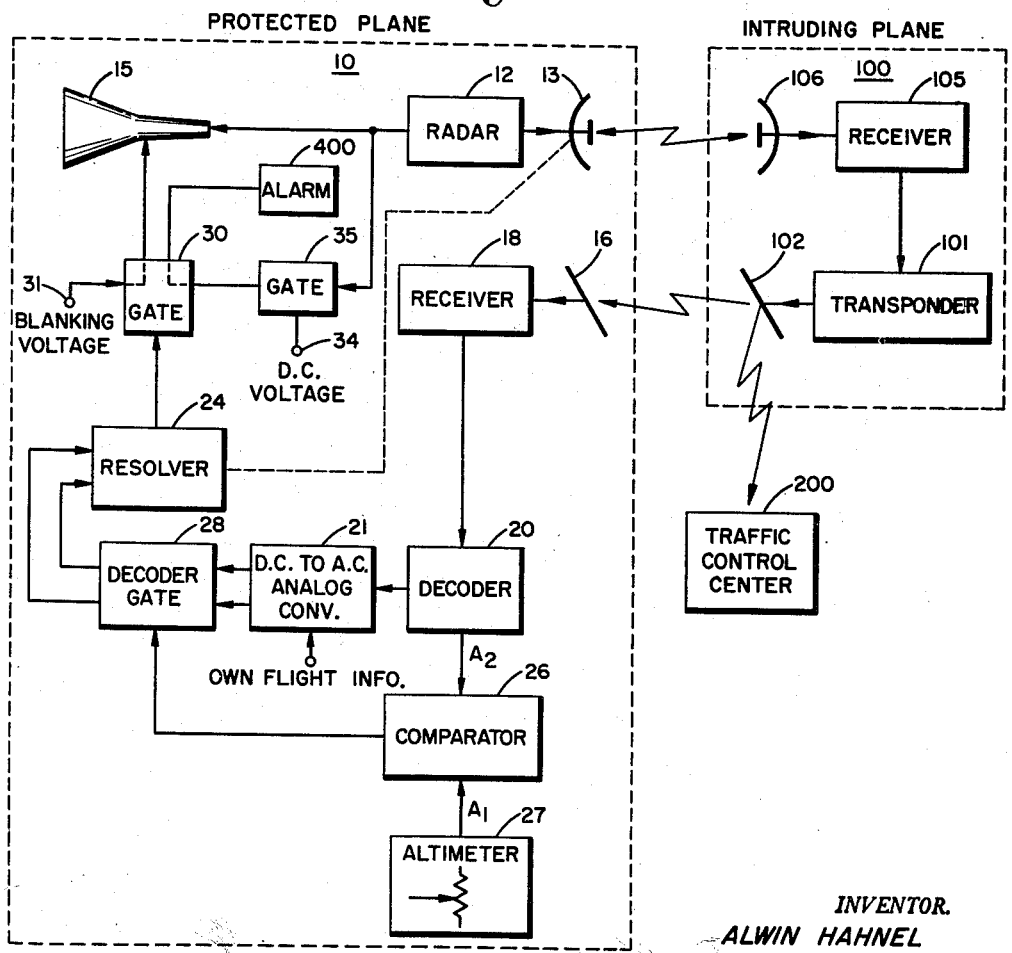
FIG. 2 is a block diagram of a typical system in accordance with the invention.
Figure 3:
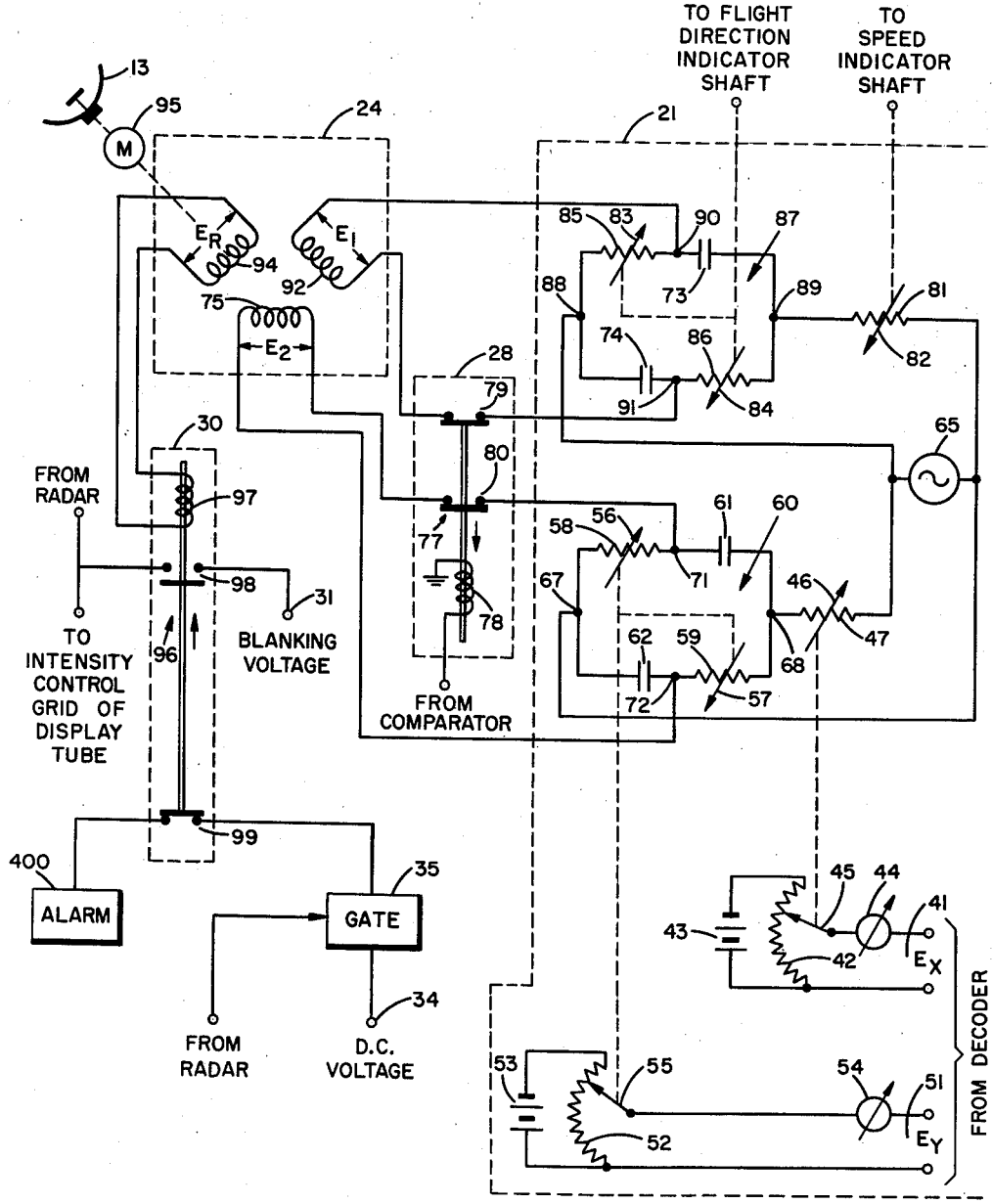
FIG. 3 is a diagram illustrating certain details of the system shown in FIG. 2.

An alternative method of providing warning of an imminent collision, as by an audible alarm or lamp, will be mentioned during the description of the system of FIGS. 2 and 3.

Referring to FIG. 2, the protected plane 10 has a radar 12 installed therein. This radar may be a high frequency weather radar which comprises a portion of large aircraft's electronics complement. Radar 12 includes a directional antenna 13 which is rotated in the usual manner by an antenna drive motor so as to scan in azimuth. The antenna beam pattern covers an appreciable elevation above and below the protected plane. As already mentioned in connection with FIG. 1, a conventional display tube 15 also forms part of the radar 12.

More and more planes are being provided normally with a transponder 101 for transmitting flight information over a carrier frequency differing from that of the radar 12 in the protected plane to a ground traffic control center 200 in response to interrogation signals received from the ground control center. The latter does not form a part of the system according to the invention, however, but is shown only to emphasize the fact that the transponder may be a conventional part of the intruding plane's equipment modified for utilization in applicant's invention.

Radar pulses of frequency $f_1$ from the radar 12 of the protected plane may be used to interrogate any intruding planes; these interrogation pulses may be received by a receiver 105 carried in the intruding plane. The radar pulses of frequency $f_1$ incident on receiver antenna 106 triggers the transponder 101 into operation whereupon coded flight information is transmitted by way of transponder antenna 102 over a carrier frequency $f_2$ to a receiver 18 in the protected plane 10. The flight information from transponder 101 may be in the form of binary digital information set in at the intruding plane 100 to indicate the altitude, speed and heading of the intruding plane. For example, the intruding plane 100 may have an analog-to-digital converter (encoder) in which the shaft of the altimeter, the speed indicator and the flight direction indicator are each connected to a corresponding shaft of a binary-coded disc or drum having circumferential rows of conducting areas and a plurality of brushes connected to each row for deriving coded information bits necessary to indicate adequately the altitude, speed and flight direction of the intruding plane 100. An example of such an encoding system is shown in an application of Robert J. Ertman et al., Serial No. 53,308, filed August 31, 1960, now U.S. Patent No. 2,997,540. This application is a continuation of the Ertman et al. application, Serial No. 730,566, filed April 24, 1958, now abandoned.

The information received through antenna 16 of receiver 18 in protected plane 10 is applied to decoder 20, a digital-to-analog converter. This unit may convert the binary or digital information transmitted by the intruding plane 100 and received by receiver 18 of the protected plane 10 into direct current voltages which are representative of the present altitude, flight speed and flight direction of the intruding plane. The decoder 20 is followed by a converter 21 which contains provisions for converting the direct current voltage from the decoder into alternating current voltages suitable for use in a resolver 24.

It should be understood that this invention is not restricted to transmission of information from a transponder in digital code. Analog information can be transmitted directly to the protected plane, as, for example, by superimposing voltages indicative of flight characteristics on a carrier. In this case, the decoder 20 would be replaced by a demodulator.

A direct current voltage $A_2$ from the decoder 20 representative of altitude of the intruding plane 100 is supplied to a comparator 26, together with a direct current voltage $A_1$ from the altimeter 27 of the protected plane 10. When the two inputs of the comparator 26 are substantially equal, there is no output voltage from the comparator and the decoder gate 28 is enabled. Whenever an output voltage is derived from the comparator, that is, when the two altitudes are not substantially equal, the decoder gate 28 is inhibited. Consequently, whenever the altitude of the protected plane 10 is not substantially equal to the altitude of the intruding plane 100, resolver 24 is not supplied with analog information from the converter 21. The resolver 24 is connected mechanically to the antenna drive motor and rotates with the antenna 13 of radar 12 located in the protected plane 10. The analog information supplied to the resolver 24, when decoder gate 28 is enabled, is obtained from the converter 21 and from the flight information derived in protected plane 10. The information from these sources represents the flight speed and flight direction of the respective planes.

The output of the resolver 24 may be connected to a gate 30 to which is applied a blanking voltage from terminal 31. When the voltages applied to the resolver 24 are such that the resolver output voltage is a minimum, gate 30 is inhibited and the blanking voltage is not applied to the display tube 15. During the period that the blanking voltage is removed, the display tube screen is sensitive to returning radar echoes; while the resolver output differs from zero, or substantially zero, gate 30 is enabled permitting the blanking voltage to be supplied to display tube 15, thereby preventing display tube luminescence even if radar echoes are received. High frequency energy from radar 12 in the protected plane 10, upon striking the intruding plane 100, will be reflected partially from the intruding plane. It will be received by the protected plane and displayed on the face of the display tube 15 in the form of a blip 370 provided that the portion of the display tube corresponding to the position of the intruding plane is not desensitized. The echo from the intruding plane will not be visible on the display tube 15, in the absence of a collision course, since the portion of the display tube screen from which the echo or blip would normally appear will be in a blanked out area of the display tube screen. Only when the two planes are flying on a collision course, a narrow sector of the display tube will not be desensitized. The position of this sector will be dependent upon the position of the closing speed vector, referred to in FIG. 1; simultaneously, an echo or blip will be visible in the sensitive sector. The appearance of this blip provides a visual warning to the pilot of the protected plane 10 that collision within the intruding plane 100 is imminent and that variation in flight pattern is necessary if collision is to be avoided.

Aural warning through a tone generator or a visual warning in the form of a light may be provided by means of an alarm 400, energized by means of a direct current voltage from terminal 34 whenever gate 30 is inhibited, and also whenever gate 35—in series with gate 30—is open. Gate 35 is enabled by means of an echo pulse from the receiver portion of radar 12. The alarm will be given, consequently, only when two conditions are satisfied concurrently, namely, that the resolver output is substantially zero and that an echo signal is present from intruding plane 100. The warning systems described in the preceding paragraph may be used alternately or in conjunction with the system described previous to the preceding paragraph.

As previously mentioned, it is assumed that digital information is transmitted from transponder 101 in the intruding plane 100. The protected plane 10 is therefore provided with a decoder 20 capable of converting the digital output of receiver 18 in the protected plane to analog information. This analog information is in the form of direct current voltages $E_x$ and $E_y$, shown in FIG. 3, and proportional, respectively, to the flight speed and flight direction of the intruding plane 100. The decoder 20 is followed by an analog converter 21 which converts these direct current voltages $E_x$ and $E_y$ into alternating current voltages $E_1$ and $E_2$ suitable for use in resolver 24. The direct current voltage $E_x$ from decoder 20, which is representative of the flight speed of the intruding aircraft 100, is applied by way of line 41 in shunt with a variable potentiometer 42 across which a direct current potential source 43 is connected. An ammeter 44 is connected in series with line 41. Movable arm 45 of the potentiometer 42 is connected mechanically to the movable arm 46 of a variable resistor 47. The direct current voltage $E_y$ from the decoder, which is representative of a flight direction of the intruding aircraft 100, is applied by way of line 51 in shunt with a variable potentiometer 52 across which a battery 53 is connected. An ammeter 54 is connected in series with line 51. The movable arm 55 of potentiometer 52 is connected mechanically to the movable arms 56 and 57 of a pair of variable resistors 58 and 59 in a phase shifting network 60 which further includes condensers 61 and 62. The portion of the movable arm 45 of potentiometer 42 may be adjusted manually until the voltage across potentiometer 42 is equal to that of the direct current voltage $E_x$ from the decoder 20 representing the speed of the intruding aircraft 100, as evidenced by zero reading of the ammeter 44. Similarly, the position of the movable arm 55 of potentiometer 52 may be adjusted manually until the voltage across potentiometer 52 is equal to that of direct current voltage $E_y$ from the decoder representing flight direction of the intruding plane; this condition exists when the ammeter 54 reads zero. Other means of positioning the arms 45 and 55 of respective potentiometers 42 and 52 may be used, of course.

An alternating current source 65 supplies energy across terminals 67 and 68 of the phase shift network 60 by way of variable resistor 47. The amplitude of the voltage across terminals 71 and 72 is dependent upon the setting of resistor 47 and the phase of the voltage is dependent upon the setting of the phase shift network resistors 58 and 59. The voltage across the other terminals 71 and 72 of the phase shifting network 60 is applied to one stator winding 75 of resolver 24 when decoder gate 28 is open (that is, when the two planes are at substantially identical altitude). The decoder gate 28 may consist of a relay 77 having a coil 78 and two contacts 79 and 80. The direct current voltage from decoder 20, which is representative of the altitude of the intruding plane 100, is supplied to voltage comparator 26, together with a voltage indicating the reading of altimeter 27 of the protected aircraft 10. This circuit is adapted to produce a minimum output current when the two input direct current voltages are approximately equal in magnitude, that is, when the altitudes are substantially identical. This output current deenergizes coil 78 of relay 77 and closes relay contacts 79 and 80 in the lines leading to the resolver 24. When the two planes are flying at different altitude, the relay 77 is energized, contact 80 is open, and the alternating current output voltage $E_2$ of the analog converter 21, representing both flight speed and direction of the intruding plane 100, is not supplied to the resolver 24. Such information is not necessary, however, since the planes obviously cannot collide while remaining at different altitudes. When the two planes are flying at the same altitude, the relay 77 is deenergized by virtue of the minimum output from comparator 26; contact 80 then is closed and the resolver 24 is supplied with the information from the analog converter 21 representing flight speed and direction of the intruding plane.

Although the description so far has mentioned aircraft as the moving vehicles, the invention is not restricted thereto. The invention may be used with surface vehicles, such as ships, in which case altitude has no significance and the altitude data, the altimeter 27, the altitude comparator 26 and the decoder gate 28 would then be eliminated.

A variable resistor 81 in the analog converter 21 has a movable arm 82 connected to the speed indicator shaft of the protected aircraft 10. The movable arms 83 and 84 of variable resistors 85 and 86 in the phase shift network 87 are connected to the flight direction indicator shaft of the protected aircraft 10. The phase shift network 87 also includes capacitors 73 and 74. The alternating current source 65, previously referred to, also supplies energy across terminals 88 and 89 of the phase shifting network 87 through resistor 81. The alternating current output voltage $E_1$ appearing across the other terminals 90 and 91 of phase shifting network 87, and representing both flight speed and direction of the protected plane 10, is applied to the stator winding 92 of the resolver 24 when contact 79 is closed, that is, when relay 77 is energized. The amplitude of the voltage across terminals 90 and 91 depends upon the setting of resistor 81, while the phase of this voltage is dependent upon the setting of the phase shifting networks 85 and 86.

In addition to the two stator windings 75 and 92 which are located at right angles to one another, the resolver 24 includes a rotor winding 94 which is mechanically connected to the rotating shaft of the motor 95, not shown in FIG. 2, which drives the antenna 13 of radar 12 in the protected plane 10. Owing to the presence of magnetic fields in the vicinity of the stator windings, the voltage in the rotor winding, induced from each of the two stator windings, varies as the rotor is turned.

The intensity control grid of display tube 15 of radar 12 is normally supplied with a blanking voltage by way of gate 30. This gate may include a biasing relay 96 having a coil 97 and a contact 98. During each revolution of the radar antenna 13, the rotor 94 of resolver 24 will reach two positions such that the resultant voltage induced therein from the fields surrounding the energized stator windings 75 and 90 is a null. The positions of zero-induced rotor voltage will depend upon relative magnitude and the phase of the voltages applied to the stator windings. The physical rotor angle, at the instant of zero voltage, corresponds to the direction of the closing speed vector relative to the heading of the protected plane. At the instant of zero rotor induced voltage, the biasing relay coil 97 is no longer energized, contact 98 opens and the blanking voltage from terminal 31 is removed from the display tube 15. During this instant, the display tube is sensitized. Owing to the limited sensitivity of the relay 96, the blanking voltage will be removed from the display tube 15 for a small time interval about the instant of zero voltage condition in the rotor winding 94. Consequently, a narrow sector will be sensitive on the display tube 15. If an echo or blip from an intruding plane appears in this sector, the operator has warning of the presence of an intruding plane which is flying a collision course with the protected plane. The pilot of the protected plane need vary the altitude, speed or direction, or any combination of these parameters, only until the blip on the illuminated sector on the display tube disappears.

Inasmuch as there are two rotary positions 180-degrees apart at which minimum induced voltage exists, for a given stator field configuration, there actually will be two illuminated sectors 180-degrees from one another on the display tube screen 314. However, only one of these will be of importance in the case of a single intruding plane since the correct azimuth of the intruding plane will be that at which a blip appears in the display tube. If two or more planes appear in the same sector, the operator can concentrate on the nearest plane, that is, the operator may focus his attention on the blip which is nearest to the plan position indicator display center.

Moreover, even with two sectors 180-degrees apart, the area to be viewed for possible interfering planes will be reduced greatly over that in conventional systems wherein the entire display tube screen must be observed and wherein it is not possible to determine readily which of possible multiple targets on the display tube screen represent planes flying on a collision course with a protected plane.

A warning of an impending collision may be obtained also by means of an alarm 400 which may be actuated by means of a direct current voltage from terminal 34 incident upon a gate 35. Gate 35 may be open to admit passage of direct current energy during the presence of a reflected radar signal from the intruding plane as detected by the receiver of radar 12. The direct current energy, however, cannot actuate the alarm 400 until one other condition is satisfied concurrently with the presence of a reflected radar signal at gate 35, namely, that contact 99 of relay 96 be closed. This latter condition exists when there is a minimum voltage induced in the rotor winding 94 of resolver 24. The alarm is actuated, consequently, only when the resolver rotor induced voltage is a minimum; while, simultaneously, the radar echo signal arrives from the intruding plane.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A collision warning system for warning the operator of a first vehicle of an impending collision with a second vehicle comprising a radar mounted in the first vehicle, transponder means in said second vehicle for transmitting first information to said first vehicle in response to an interrogation signal from the radar of said first vehicle which corresponds to the vector components of speed and direction of said second vehicle, means in said first vehicle for producing second information corresponding to the vector components of speed and direction of said first vehicle, means in said first vehicle receptive of said first and second information for converting said first and second information separately into sinusoidal voltages each representing said corresponding first and second information, a resolver having a pair of stator windings displaced by ninety electrical degrees and a rotor winding driven in synchronism with the antenna of the radar in said first vehicle, means for applying each of said sinusoidal voltages to a separate one of said stator windings whereby a resultant electromagnetic field is established in the vicinity of said rotor winding which represents the vector difference of the aforesaid vector components, a plan position indicating device forming a portion of the radar of said first vehicle, the voltage induced in said rotor winding being a null when said vehicles are traversing a collision course, means energized only when said rotor voltage is in the vicinity of said null for displaying visibly upon said indicating device radar position information supplied to said indicating device from said radar.

2. A collision warning system for warning the operator of a protected vehicle of an impending collision with an intruding vehicle comprising a radar mounted in said protected vehicle, receiving means in said protected vehicle for receiving first information from said intruding vehicle in response to an interrogation signal from the radar of said protected vehicle which corresponds to the vector components of speed and direction of said intruding vehicle, means in said protected vehicle for producing second information corresponding to the vector components of speed and direction of said protected vehicle, translation means in said protected vehicle receptive of said first and second information for translating said first and second information into resultant control information representative of the vector difference of the aforesaid vector components, a plan position indicating device mounted in said protected vehicle and receptive of energy reflected from said intruding vehicle, control means responsive to said resultant control information for deriving a control signal which attains a distinctive amplitude during a narrow time interval which is a function of the position of the vector difference of said vector components, and means actuated only when said control signal is of said distinctive amplitude for illuminating a narrow sector of said indicating device, the position of said illuminated sector being dependent upon the relative angular position of said protected and intruding vehicles, said indicating device providing a visual display of energy reflected from said intruding vehicle within said illuminated sector only when said vehicles are traveling along a collision course.

3. A collision warning system wherein two vehicles move relative to each other, said first vehicle including a radar and said second vehicle including a transponder, means in said second vehicle for transmitting in response to an interrogation signal from said first vehicle coded information indicative of the angular deviation from a reference direction and the velocity of said second vehicle, decoding means in said first vehicle for translating said coded information into first control information which is indicative of the velocity and angular deviation from said reference directions of said second vehicle, means in said first vehicle for supplying second control information representative of the angular deviation from said reference direction and the velocity of said first vehicle, control means in said first vehicle for translating said first and said second control information into a control signal having a distinctive amplitude when said first vehicle and said second vehicle are traveling along a collision course, said radar including a plan position indicator supplied with reflected radar energy from said second vehicle, said indicator device having a display surface, blanking means for normally blanking said indicator device, and means responsive to said control signal of distinctive amplitude for removing said blanking voltage from said indicator device to illuminate a sector of the display surface of said indicator device, the position of said sector being determined by the relative angular position of said first and second vehicles, the energy reflected from said second vehicle being presented within said illuminated sector of said display surface only when said vehicles are traveling along said collision course.

4. A collision warning system for warning the operator of a protected vehicle of an impending collision with an intruding vehicle comprising a radar mounted in said protected vehicle, said radar including a rotatable antenna, receiving means in said protected vehicle for receiving first information from said intruding vehicle in response to an interrogation signal from the radar of said protected vehicle which corresponds to the vector components of speed and direction of said intruding vehicle, means in said protected vehicle for producing second information corresponding to the vector components of speed and direction of said protected vehicle, translation means in said protected vehicle receptive of said first and second information for translating said first and second information into resultant control information representative of the vector difference of the aforesaid vector components, a plan position indicating device mounted in said protected vehicle, control means including a portion rotating with said antenna and responsive to said resultant control information for deriving a control signal which attains a distinctive amplitude when said rotating portion reaches a position corresponding to the position of the vector difference of said vector components, and means actuated only when said control signal is of said distinctive amplitude for illuminating a narrow sector of said plan position indicating device, said indicating device providing a visual display of energy reflected from said intruding vehicle within said illuminated sector only when said vehicles are traveling along a collision course.

5. A collision warning system for warning the operator of a protected vehicle of an impending collision with an intruding vehicle comprising a radar mounted in said protected vehicle, receiving means in said protected vehicle for receiving first information from said intruding vehicle in response to an interrogation signal from the radar of said protected vehicle representative of altitude and the vector components of speed and direction of said intruding vehicle, means in said protected vehicle for producing second information corresponding to the altitude and vector components of speed and direction of said protected vehicle, translation means in said protected vehicle receptive of said first and second information for translating those portions of said first and second information corresponding to direction and speed into resultant control information representative of the vector difference of the aforesaid vector components, a plan position indicating device mounted in said protected vehicle and receptive of energy reflected from said intruding vehicles, control means responsive to said resultant control information for deriving a control signal which attains a distinctive amplitude during a narrow time interval which is a function of the position of the vector difference of said vector components, means receptive of the portions of said first and second information from said vehicles corresponding to altitude for disabling said translation means when the altitude of said vehicles are substantially different, and means actuated only when said control signal is of said distinctive amplitude for simultaneously illuminating a narrow sector of said plan position indicating device, the position of said illuminating sector being dependent upon the relative angular position of said vehicles, said indicating device providing a visual display of energy returned from said intruding vehicle within said illuminated sector only when said vehicles are traveling along a collision course.

References Cited by the Examiner
UNITED STATES PATENTS

| | | | |
|---|---|---|---|
| 2,568,568 | 9/51 | Stansbury | 343—112.4 |
| 2,933,726 | 4/60 | Campbell et al. | 343—112.4 |
| 3,071,767 | 1/63 | Freedman | 343—112.4 |
| 3,113,211 | 12/63 | Thews | 343—112.4 |

FOREIGN PATENTS

| | | |
|---|---|---|
| 1,221,513 | 1/60 | France. |

KATHLEEN H. CLAFFY, *Primary Examiner.*

CHESTER L. JUSTUS, FREDERICK M. STRADER,
*Examiners.*